United States Patent
Anand et al.

(10) Patent No.: US 8,150,674 B2
(45) Date of Patent: Apr. 3, 2012

(54) AUTOMATED TESTING PLATFORM FOR EVENT DRIVEN SYSTEMS

(75) Inventors: Rajan Anand, Edison, NJ (US); Paritosh Bajpay, Edison, NJ (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 519 days.

(21) Appl. No.: 12/476,954

(22) Filed: Jun. 2, 2009

(65) Prior Publication Data

US 2010/0306590 A1  Dec. 2, 2010

(51) Int. Cl.
G06F 9/45 (2006.01)
G06F 9/455 (2006.01)

(52) U.S. Cl. .......................................... 703/22; 703/23

(58) Field of Classification Search .................... 703/22, 703/23
See application file for complete search history.

(56) References Cited

U.S. PATENT DOCUMENTS

| | | | |
|---|---|---|---|
| 5,781,720 A * | 7/1998 | Parker et al. ............... 714/38.11 |
| 6,158,031 A | 12/2000 | Mack et al. | |
| 6,279,124 B1 | 8/2001 | Brouwer et al. | |
| 6,959,433 B1 | 10/2005 | Morales, Jr. et al. | |
| 7,158,924 B2 * | 1/2007 | Williams et al. ................. 703/17 |
| 7,162,404 B2 * | 1/2007 | Hunt et al. ....................... 703/16 |
| 7,228,458 B1 * | 6/2007 | Kesavan ......................... 714/41 |
| 7,529,653 B2 * | 5/2009 | Frankel et al. ................... 703/13 |
| 2003/0065979 A1 | 4/2003 | Shaw | |
| 2003/0101041 A1 * | 5/2003 | Gabele et al. .................... 703/22 |
| 2004/0117759 A1 * | 6/2004 | Rippert et al. ................ 717/100 |
| 2006/0036910 A1 | 2/2006 | Fung et al. | |
| 2006/0052965 A1 | 3/2006 | Nodwell | |
| 2007/0168983 A1 | 7/2007 | Ishimura | |
| 2009/0119055 A1 | 5/2009 | Glowaty | |
| 2011/0054875 A1 * | 3/2011 | Chang et al. .................... 703/14 |

* cited by examiner

*Primary Examiner* — David Silver

(74) *Attorney, Agent, or Firm* — Parks IP Law LLC; Jennifer P. Medlln, Esq.

(57) ABSTRACT

A platform for the automated testing of event driven software applications is provided. A source environment is replicated to a target environment. The target environment includes a target system. A test case is defined with a target system, specific attributes and verification information. The attributes of the test case include the target system. The test case is fired. An event is simulated for the test case based on the target system and the specific attributes. The simulated event is transmitted to the target environment. The results of the test case being fired are determined based on verification information. The results are recorded to a data store.

20 Claims, 19 Drawing Sheets

| TestCase | Attributes |
| --- | --- |

TestCase Name: [Test Case 1 for System 1]

System Name: [AOTS ▸]

Simulator Interface: [AOTS_V18 ▸]

Template Loc: [　　　　] (Use only if you want to send special case aray values else leave blank)

Event Type: [Completion Deadline is Timeout ▸]

Active: [Yes ▸]

[Add]

*** Add New TestCase

FIG. 4A

| TestCase | Attributes |

Attribute Name: AccountContactPhone ▸  Value: 7324206111
Attribute Name: ActivityTypeCodeDesciption ▸  Value: SV
Attribute Name: CurrSerialNumber ▸  Value: 1234
Attribute Name: FunctionalArea ▸  Value: GLOBAL_AM
Attribute Name: None  Value: None

- AccountContact Phone
- AccountQualifier
- AccountType
- Action
- ActiveOrg
- ActivityTypeCode
- ActivityTypeCodeDescription
- AdditionalNotificationGroupList
- AdjustedTimeToRapair
- AdjustedTimeToRestore

[Add]

FIG. 4B

Automated Test Platform
ATP Release 0.7

- Global Configuration
- Edit My Configuration
- Point Env To
- Manage All Test Cases
- Search TestCases
- Load & Soak
- Schema Browser
- Create Environment
- View Reports
- Create new user
- About ATP
- Feedback & Wish List Logout

TestCase Set : demo.xml
Local Environment Points To : GLOBAL

| Select | TestCase Name | Event Type | System | Active | Fire | Mod | Rem | Crit |
|---|---|---|---|---|---|---|---|---|
| ☐ | ADOPT_R16 | Team | ADOPT | Yes ▼ | f | ✐ | ☐ | ✐ |
| ☐ | ADOPT_R17 | ToDoActivity | ADOPT | Yes ▼ | f | ✐ | ☐ | ✐ |
| ☐ | ADOPT_R18c | ToDoActivity | ADOPT | Yes ▼ | f | ✐ | ☐ | ✐ |
| ☐ | ADOPT_R18o | ToDoActivity | ADOPT | Yes ▼ | f | ✐ | ☐ | ✐ |
| ☐ | AORSCR_R15_1 | SendEmail | AOTSCR | Yes ▼ | f | | ☐ | ✐ |
| ☐ | AOTSChange_ITAssets_V18c | ChangeCreated | AOTSCHANGE | Yes ▼ | f | ✐ | ☐ | ✐ |
| ☐ | AOTSChange_Legacy_V18c | ChangeCreated | AOTSCHANGE | Yes ▼ | f | ✐ | ☐ | ✐ |
| ☐ | AOTSChange_MRG_V18c | ChangeCreated | AOTSCHANGE | Yes ▼ | f | ✐ | ☐ | ✐ |
| ☐ | AOTSChange_MRG_V18o | ApproverGroup Added | AOTSCHANGE | Yes ▼ | f | ✐ | ☐ | ✐ |
| ☐ | AOTSChange_ITAssets_R18o | UpdateProductAff | AOTSCHANGE | Yes ▼ | f | ✐ | ☐ | ✐ |
| ☐ | AOTSChange_Legacy_R18o | SMCustomerNotify | AOTSCHANGE | Yes ▼ | f | ✐ | ☐ | ✐ |
| ☐ | AOTSCR_R15 | SendEmailwithAtta | AOTSCR | Yes | f | ✐ | ☐ | ✐ |

[Add] [Delete] [Modify] [Copy] [Fire] [Fire All] [Persist]

Automated Test Platform
ATP Release 0.7

Logout

Global Configuration
Edit My Configuration
Point Env To
Manage All Test Cases
Search TestCases
Load & Soak
Schema Browser
Create Environment
View Reports
Create new user
About ATP
Feedback & Wish List

Specify details to create Database Snapshot

| | |
|---|---|
| Oracle Rules Host Machine IP: | |
| Oracle Rules Host Machine userid: | |
| Oracle Rules Target Machine IP: | |
| Oracle Rules Target Machine userid: | |
| Oracle Rules Destination Path: | |
| Oracle Rules User Id: | |
| Oracle Rules Password: | |
| Oracle Rules ORACLE HOME: | |
| Oracle Rules tns: | |
| Oracle Rules Export file name: | |
| Oracle Rules Log file name: | |
| Oracle Rules rows: | no ▷ |
| Oracle Rules indexes: | no ▷ |

Run

FIG. 10A

Automated Test Platform
ATP Release 0.7

- Global Configuration
- Edit My Configuration
- Point Env To
- Manage All Test Cases
- Search TestCases
- Load & Soak
- Schema Browser
- Create Environment
- View Reports
- Create new user
- About ATP
- Feedback & Wish List Logout

Specify Source

Weblogic Machine IP:
Weblogic Port:
Weblogic Machine Location:

Specify Target

Weblogic Machine IP:
Weblogic Port:
Weblogic Machine Location:

[Run]

FIG. 10B

Automated Test Platform
ATP Release 0.7

Logout

Global Configuration=>System Details

Global Configuration
Edit My Configuration
Point Env To
Manage All Test Cases
Search TestCases
Load & Soak
Schema Browser
Create Environment
View Reports
Create new user
About ATP
Feedback & Wish List

| ADOPT | AOTS | AOTSCHANG | AOTSCR | BGW | BMP | CBUSECRM | CPNI | ECON |
|---|---|---|---|---|---|---|---|---|
| ECRM | EFMS | EMB2B | IGLOO | | | | | |

- X EventAttribute.AOTSCR_EVENTATTR6   Subject
- X EventAttribute.AOTSCR_EVENTATTR7   Message
- X EventAttribute.AOTSCR_EVENTATTR8   FaxNumber
- X EventAttribute.AOTSCR_EVENTATTR9   GroupName
- X EventAttribute.AOTSCR_EVENTATTR10  FileName
- X EventAttribute.AOTSCR_EVENTATTR11  FileType
- X EventAttribute.AOTSCR_EVENTATTR12  CompanyName
- X EventAttribute.AOTSCR_EVENTATTR13  VoicePhone
- X EventAttribute.AOTSCR_EVENTATTR14  ToName

[Add]

- X EventType.AOTSCR_EVENTTYPE1  SendEmail
- X EventType.AOTSCR_EVENTTYPE2  SendEmailwithAttachment
- X EventType.AOTSCR_EVENTTYPE3  SendFax

[Add]

[SAVE]

FIG. 11B

Automated Test Platform
ATP Release 0.7

- Global Configuration
- Edit My Configuration
- Point Env To
- Manage All Test Cases
- Search TestCases
- Load & Soak
- Schema Browser
- Create Environment
- View Reports
- Create new user
- About ATP
- Feedback & Wish List Logout

My Personal Configuration File Settings:

Point My ATP Environment To Following Server Instance:
All test cases will point to this server instance
This overrides your local and global configuration URL settings

[Type custom URL here or selection from below ▽]  [UpdateURL]

View and/or Override System Properties or System Details Configuration
Any value you set here overrides your global configuration

[Local System Properties ▽]  [View / Edit]

FIG. 11C

AUTOMATED TESTING PLATFORM FOR EVENT DRIVEN SYSTEMS

TECHNICAL FIELD

Embodiments relate to the automated testing of event driven systems. More particularly, embodiments relate to the running of test cases for event driven systems in an automated fashion.

BACKGROUND

Conventional software testing tools provide for automating the testing of a software application or system by simulating input into a graphical user interface (GUI) of the software application. The simulated input is received by the software application being tested and the testing tool captures the response of the software application by information returned to the GUI. The GUI for a software application is commonly considered the front end of the system. Such tools that provide front end testing of software applications typically do not address testing of the transactions taking place in the backend of the system. The backend of a software application can be considered the elements of the system that are not presented to a user of the system. For software applications that are primarily driven by events, front end testing tools provide limited use in evaluating the proper functioning of the software application. An event, in relation to this application, is a transaction related to a software system other than receiving input from a user or the transmission of user output.

Typically, testing the backend functionality of a system involves multiple steps. A non-exclusive list of steps typically performed for backend testing includes: setting up the testing environment, deploying the software, creating test cases, the execution of test cases, regression/stress testing and evaluating the results of the test cases and the regression/stress testing. Typically, the evaluation of the results is performed by testers manually searching the software application logs for the results. All of these steps are typically performed manually or with the use of custom written scripts. The manual operation of these steps and their ad hoc nature requires organizations that test software applications to spend considerable time and effort performing the manual steps and writing scripts each time it is necessary to test a software application.

SUMMARY

Embodiments address issues such as these and others by providing for the automation of the backend testing of software applications. Various embodiments provide for the creation of test cases in a standardized GUI and the saving of the created test cases in a data store. Embodiments further provide for specifying of conditional statements and criterion for the evaluation and verification of test cases. Embodiments also further provide for the simulation of events in response to the firing of test cases and the transmission of the events to a target environment. Additionally, embodiments provide for the verification of the results based on the specified conditional statements and criterion. Embodiments further provide for the logging of the results to a data store and for regression and stress testing of event driven systems.

Embodiments include a method for the automated testing of an event driven software application. The method involves retrieving an event structure and default attributes for one or more systems from configuration files of each of the one or more systems. The method further involves creating one or more adaptors for each of the one or more systems from the event structure and the default event attributes of each of the one or more systems, each adaptor defined for a particular system. The method additionally involves receiving information that specifies a target system, non-default event attributes, and verification information to create a test case. When a request to fire the test case is received, the method further involves an adaptor for the target system being executed where the adaptor provides the event structure and default event attributes for events of the target system. The method additionally involves a simulated event being generated upon receiving the request to fire the test case. The simulated event is generated based on the event structure, default event attributes and non-default attributes. The method also involves the simulated event being transmitted to the target system and the results being determined by examining a response of the target system to the simulated event and comparing the response to the verification of the test case when a request to fire the test case is received.

Embodiments provide a computer readable medium containing instructions that when executed by a processor result in acts that include receiving a request to fire a test case, wherein the test case specifies a target system, non-default event attributes, and verification information. The acts further involve in response to the request to the fire the test case, a processor executing an adaptor, wherein an adaptor is defined for a plurality of target systems, each adaptor specifying an event structure and default event attributes based on information contained in configuration files of each target system. The acts additionally involve receiving from the executed adaptor the event structure and default attributes of the target system and generating a simulated event based on the event structure, the default event attributes and the non-default event attributes. The acts also involve transmitting the simulated event to the target system and determining the results of the test case by examining a response of the target system to the simulated event and comparing the response to the verification information of the test case.

Embodiments include a method for the automated testing of an event driven software application. The method involves receiving a request to fire a test case, wherein the test case specifies a target system, non-default event attributes, and verification information. The method further involves in response to the request to the fire the test case, a processor executing an adaptor, wherein an adaptor is defined for a plurality of target systems, each adaptor specifying an event structure and default event attributes based on information contained in configuration files of each target system. The method additionally involves receiving from the executed adaptor the event structure and default attributes of the target system and generating a simulated event based on the event structure, the default event attributes and the non-default event attributes. The method also involves transmitting the simulated event to the target system and determining the results of the test case by examining a response of the target system to the simulated event and comparing the response to the verification information of the test case.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DESCRIPTION OF THE DRAWINGS

FIG. 4a shows one example of a primary tab of a new test case screen.

FIG. 4b shows one example of an attributes tab of the new test case screen.

FIG. 5a shows one example of a test case selection screen.

FIG. 5b shows one example of a screen window detailing the additional properties and attributes of a test.

FIG. 10a shows an example of a screen for taking a snapshot of a database.

FIG. 10b shows an example of a screen for replicating an environment.

FIG. 11b shows an example of a screen for defining attributes contained within the global configuration.

FIG. 11c shows an example of a screen for modifying local configuration settings.

DETAILED DESCRIPTION

Figure 1:
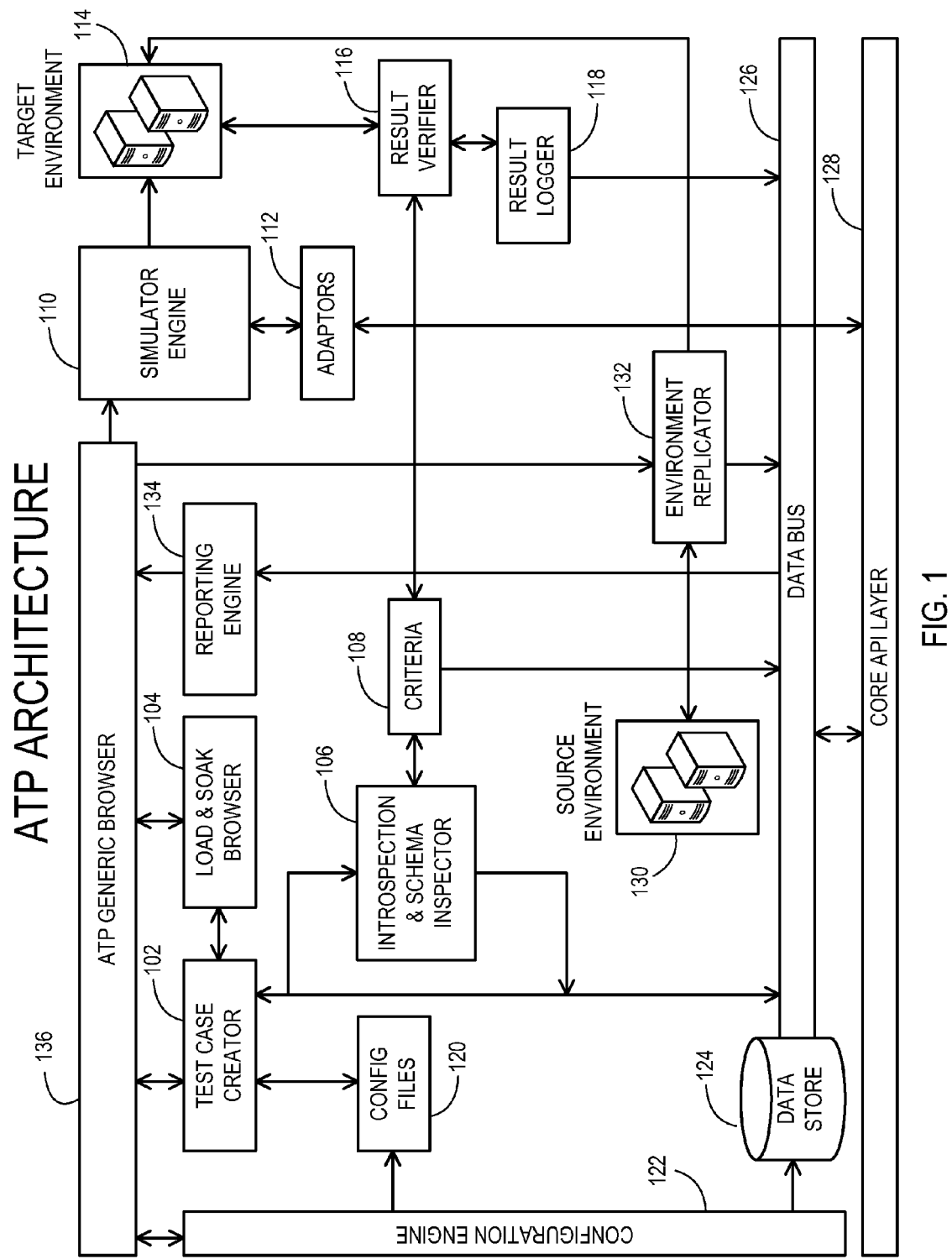
FIG. 1 shows an example of the architecture of an automated testing platform.

Embodiments provide for the creation of test cases in a standardized GUI and the saving of the created test cases in a data store. Embodiments further provide for the verification of test cases by simulating events and transmitting the events to a target environment. Embodiments additionally provide for the replicating of a source environment and the configuration of a target environment. In an exemplary embodiment, the automated testing platform can be designed to provide testing services for software applications that support web services and can be optimized for systems utilizing a Service Oriented Architecture (SOA).

The automated testing platform (ATP) described throughout this application is referred to as the platform. In an embodiment, the platform can be used to take a snapshot of the environment of an event driven software application that requires testing to be performed. The snapshot can be stored within the platform. An event driven software application or application server is also referred to generally as a system. A snapshot refers to a copy of the set of files and directories on the source environment that are related to a system. An environment encompasses the system as well as the related structure and objects on a machine necessary for a system to function properly. The environment of the software application that a snapshot is taken of can be referred to as the source environment.

A machine, as referred to in this disclosure, is a computer capable of executing software. The computer can include a processor and computer readable media. Computer readable media can include magnetic and optical storage devices. The platform itself can be resident on one or more computers.

A target environment can be created for performing testing. The source environment can be replicated to a target machine with the use of the snapshot stored within the platform to create a target environment. With the creation of a target environment, a target system is created capable of processing events. A target environment separate from the source environment allows testing to take place without any negative effects on the source environment. Separate source and target environments are not a requirement for testing to be performed. The source environment may be used also as the target environment for the transmission and processing of events.

A test case can be created for testing a software application. A test case can include all attributes and parameters necessary for firing the test case, creating a simulated event, and verifying the results of the simulated event being executed by the target system. Conditional statements along with criterion for the results of the conditional statements to be compared to can be defined for a test case. The combination of conditional statements and criterion for a test case can be referred to as verification information. The event for a test case can be simulated with the aid of an Adaptor. The Adaptor can provide default attributes for the simulated event. The simulated event can be transmitted to a target environment where the event is received and processed by the target system. The results of the test case can be verified by interrogating or querying the structured storage of the target environment, applying the conditional statements to the log files and determining whether the results of the conditional statements correspond to the specified criterion. The structured storage may comprise a database, a structured log file or any structured data store. The results of the test case can be logged and reported to a user.

FIG. 1 shows one example of an architecture for the automated testing platform. For ease in understanding of the platform, related functions of the platform can be organized into modules. One skilled in the art will appreciate that functions incorporated into any particular module can vary and that organizing the functions of the platform into distinct modules is not required. In one embodiment, particular modules may be accessed by a user through various web browsers. The user access to the modules can be presented in a standardized Graphical User Interface (GUI) format.

As shown in FIG. 1, a Test Case Creator 102 can be provided for defining and controlling the firing of test cases. A Load & Soak Browser 104 can be provided for controlling the running of multiple test cases and configuring multiple test cases to be fired at the same time in a repetitive fashion. An Introspection & Schema Inspector 106 can be provided for creating verification information for test cases by identifying the data structure of a target environment. A Criteria Engine 108 can be provided for defining criterion for verifying the results of test cases. Events can be simulated for the running of test cases. A Simulator Engine 110 can be provided for simulating events based upon input received from test cases. Adaptors 112 can be provided for the Simulator Engine 110 to access, the Adaptors 112 providing additional input to the Simulator Engine 110 for the creation of simulated events.

As shown in FIG. 1, a target environment 114 can be provided for receiving simulated events and responding to the received simulated events. A Result Verifier 116 can be provided for verifying the results of a test case based on the response of the target environment 114 to simulated events that correspond to fired test cases. A Result Logger 118 can be provided for logging the results verified by the Result Verifier 116. Configuration Files 120 can be provided for maintaining the configuration of systems defined for testing by the platform. A Configuration Engine 122 can be provided for interacting with the Configuration Files 120 and for the platform accessing and reading the Configuration Files 120. A Data Store 124 can be provided for storing information pertaining to the platform. A Data Bus 126 can be provided so that each one of the modules may communicate with the Data Store 124 and each other. The Core Application Programming Interface (API) Layer 128 can be provided to provide the programming structure for each one of the modules.

As shown in FIG. 1, a Source Environment 130 can be accessed by the platform. The Source Environment 130 is any environment that requires the replication of its environment so test cases may be ran for testing a software application installed in the source environment. The Source Environment 130 can also be any environment that a user wishes to replicate from one location to another. An Environment Replicator 132 can be provided as part of the platform. The Environment Replicator 132 can provide for the replicating of the source environment 130 to the target environment 114. A Reporting Engine 134 can be provided for reporting the results of test case. An ATP Generic Browser 136 can also be provided such that a user can access the platform.

Figure 2:
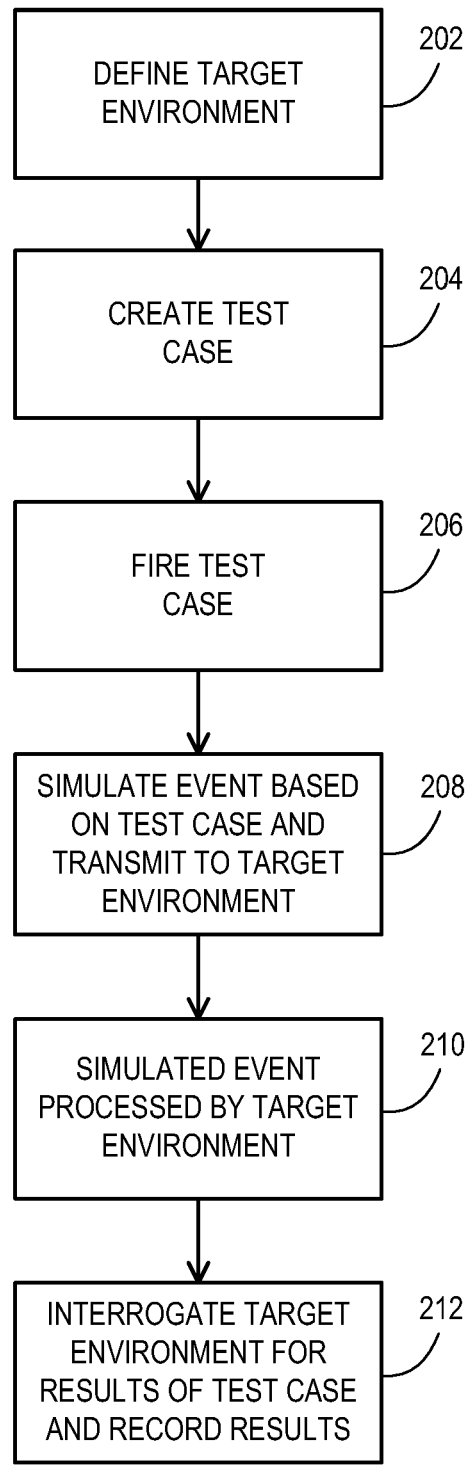
FIG. 2 shows one example of a set of generalized steps for the operation of the automated testing platform.

FIG. 2 shows one example of a set of generalized steps that may be performed for the operation of the platform. In step 202 the target environment 114 can be defined for the processing of simulated events. The target environment 114 can be defined by replicating the environment of a source environment 130. The source environment 130 can be replicated to a target machine to create a target environment 114 so that the platform may run test cases on the target environment 114 without disturbing the source environment 130 with the testing. The target environment 114 can also be a test environment previously configured for the platform to use for executing test cases by providing a system for the transmission and processing of simulated events. In an exemplary embodiment, when simulated events are transmitted to the target environment 114, the target system of the target environment 114 processes the simulated events as the software application would normally process received events. That the events are simulated is transparent to the target system.

In step 204 shown in FIG. 2, a test case can be created. A test case can be created by specifying the system that the test case is to be created for. The particular attributes for the test case can also be specified. Once the test case has been created the test case can be fired. When the test case is fired, in step 206, the platform can dispatch the test case to the Simulator Engine 110. When the Simulator Engine 110 receives the test case, in step 208 the Simulator Engine 110 can simulate an event. The event can be simulated based upon the attributes of the test case. Once the event is simulated the event can be transmitted to the target environment 114. The target environment 114 can be specified as an attribute of the test case.

In step 210 shown in FIG. 2, once the simulated event is transmitted by the Simulator Engine 110 and received by the target environment 114, the target system can process the simulated event. The target system can process the simulated event as an event that would be expected for the target system in the regular course of the execution of the software application. Once the simulated event is processed by the target system, in step 212, the platform can interrogate data of the target system pertaining to received events to discover the results of the target system processing the simulated event. Once the results of the target system processing the simulated event are identified by the platform, in step 212 the platform can record the results of the simulated event/test case.

Figure 3:
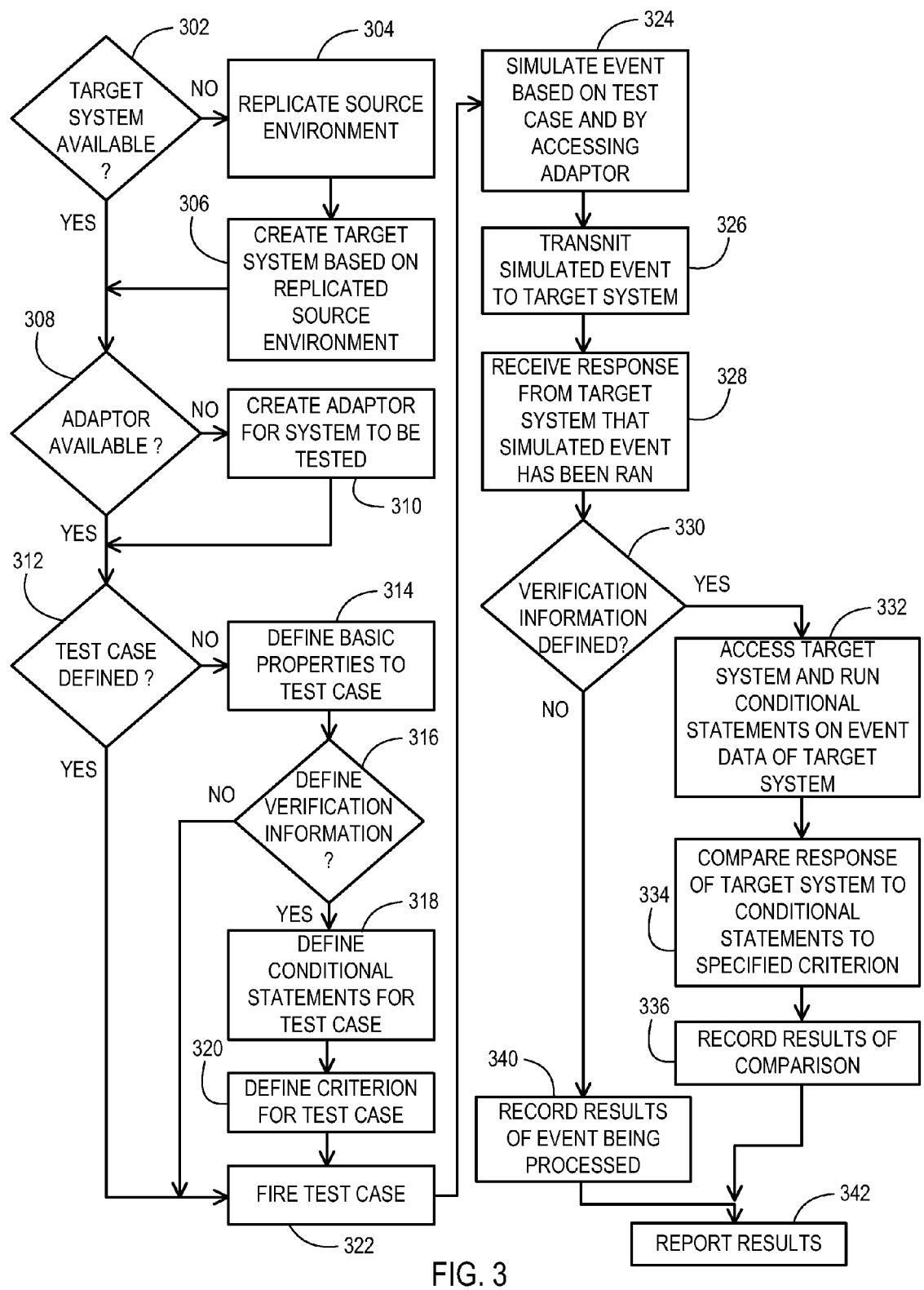
FIG. 3 shows one example of a set of detailed steps that may be performed for the operation of the automated testing platform.

FIG. 3 shows one example of a set of detailed steps that may be performed for the operation of the platform. In step 302, whether a target environment 114 has been defined for testing can be determined. The target environment also includes a target system for processing received events. When no target environment 114 is available, a source environment 130 can be replicated in step 304. Once the source environment 130 is replicated, a target environment 114 can be configured in 306. The target environment 114 can be based on the replicated source environment 130. When the target environment 114 has been defined for the test system, the flow can proceed to step 308.

In step 308, as shown in FIG. 3, whether an Adaptor is required for the test system can be determined. When no Adaptor is available an Adaptor can be created based on the configuration files of the source environment 130 that correspond to the test case in step 310. An Adaptor may be created dynamically from configuration files of the source environment 130 defined on the platform. When an Adaptor has been defined for the source environment 130, flow can proceed to step 312. In step 312, whether a desired test case has been defined can be determined. When a desired test case is available, flow can proceed to step 320. When no desired test cases have been defined, flow can proceed to step 314. In step 314, the basic properties of a new test case can be defined. Once the basic properties of a test case have been defined, flow can proceed to step 316.

In step 316, as shown in FIG. 3, whether verification information is to be defined for the test case can be determined. When verification information is not to be defined for the test case, flow can proceed to step 322. When verification information is to be defined for the test case, flow can proceed to step 318. In step 318, conditional statements can be defined for the test case. In step 320, criterion for results of the conditional statements to be compared to can be defined.

In step 322 shown in FIG. 3, the test case can be fired. Once the test case is fired, the firing of the test case can prompt the simulation of an event based on the attributes of the test case and the response of an Adaptor as shown in step 324. In step 326, the simulated event can be transmitted to the target environment 114. Once the target environment 114 processes the simulated event, the platform can receive a response from the target environment 114 that the event has been simulated in step 328.

Once a response has been received indicating the event has been simulated, whether verification information has been defined for the test case can be determined in step 330 of FIG. 3. When verification information has been defined for the test case, flow can proceed to step 332. When no verification information has been defined for the test case, flow can proceed to step 330. In step 332, the event data of the target environment 114 can be accessed. The data in the structured storage of the target system can be queried with the conditional statements defined for the test case in step 334. The response of the target environment 114 to the conditional statements can be compared to criterion defined for the test case in step 336. The results of the comparison can be recorded in step 338. When no verification information has been defined for the test case, the results of the test case being processed by the target environment 114 can be recorded in step 340. Once the results of the test case have been recorded, the results can be reported in step 342.

As mentioned above, the functions of the platform can be organized into modules. One module of the platform can be the Test Case Creator 102. The Test Case Creator 102 as shown in FIG. 1 can provide for defining and configuring test cases. When a test case is defined it can be saved in the data store. A new test case can be created by entering the name of the test case, the event type that the test case is to simulate, specifying the source system that the test case is simulating, and whether the test case is active or not. In an exemplary embodiment, the test case is defined by a plurality of XML statements. The test case can also be defined by other means such as another open language other than XML or by the use of various proprietary statements. Once the definition of the test case is complete the test case can be saved in the Data Store 124.

A user interface screen can be provided for defining new test cases. The screen for adding new test cases can comprise two tabs. One of the tabs can be for providing the basic properties of a test case. In an exemplary embodiment, the basic properties of a test case can include: a test case name, a source system name that the test case is simulating events for, a simulator interface (i.e. Adaptor), a template location to bootstrap the simulated events attribute values, an event type, and whether the test case is active. The event types available for a test case will depend upon the source system that is selected for a test case. Particular examples of event types can include: change created, approver group added, send email, and send email with attachment. When a test case is inactive the test case is disabled from being fired. FIG. 4a shows one example of the initial tab of a new test case screen.

Another tab for a new test case screen can be the attributes tab. FIG. 4b shows one example of the attributes tab of the new test case screen. The attribute tab can comprise a plurality of fields with drop down boxes to select an attribute name to specify for the event to be simulated by the test case. The attribute name field can have a corresponding value field to specify a value for the attribute. The field for the value can accept free-form text or can query a structured storage to list available values. For test cases that have been defined and saved to the data store, the screens shown in FIG. 4a and FIG. 4b can be used to modify the properties and attributes of existing test cases.

After a test case is created, it can be selected for execution. The executing of a test case can also be referred to as "firing" of the test case. In an exemplary embodiment, the platform provides for selecting multiple test cases at once for firing. The platform can also provide the ability to select multiple test cases and perform other actions at once to each selected test case. Other actions that can be performed on a plurality of test cases include: deleting, modifying and copying.

FIG. 5a shows one example of a test case selection screen. One or more test cases can be selected by the user selecting a check box placed in front of the name of each test case. The various actions to be performed on the one or more test cases can be selected by the user with buttons placed on the user screen as shown in FIG. 5a. The interface can include a select box, a test case name, an event type, a system name, and an indicator of whether the test case is active for each test case.

Additionally, the user screen of FIG. 5a can provide shortcuts for each test case. Each shortcut performs an indicated function for the particular test case that the shortcut is associated to. The association for a shortcut to a particular test case is shown by the shortcut and test case being located in the same row of the user screen. Certain examples of shortcut buttons that can be provided include: a fire shortcut, a modify shortcut, and a remove shortcut. Navigational shortcuts can be provided on the interface for the user to navigate to additional screens.

Additional properties and attributes can be specified for a test case. These properties and attributes can include current properties, default properties and attributes. The current properties can include: Server Uniform Resource Locator (URL), URL Suffix, and Event Template. The default properties can include: Server URL, URL Suffix, Event Template, Class Name, Test Case Name, Simulator Interface, Event Type and Template Location.

There can be two levels of properties: Global properties and local properties. The Global properties apply to all users. A particular user can change these settings by editing local properties of the user and saving the local properties of the user. The local properties override the global properties for test cases defined by the user. Additionally, a user can temporarily override and point all test cases to a particular URL. Pointing all test cases to a particular URL is transient and does not persist from a first user session to a second user session.

Figure 5B:
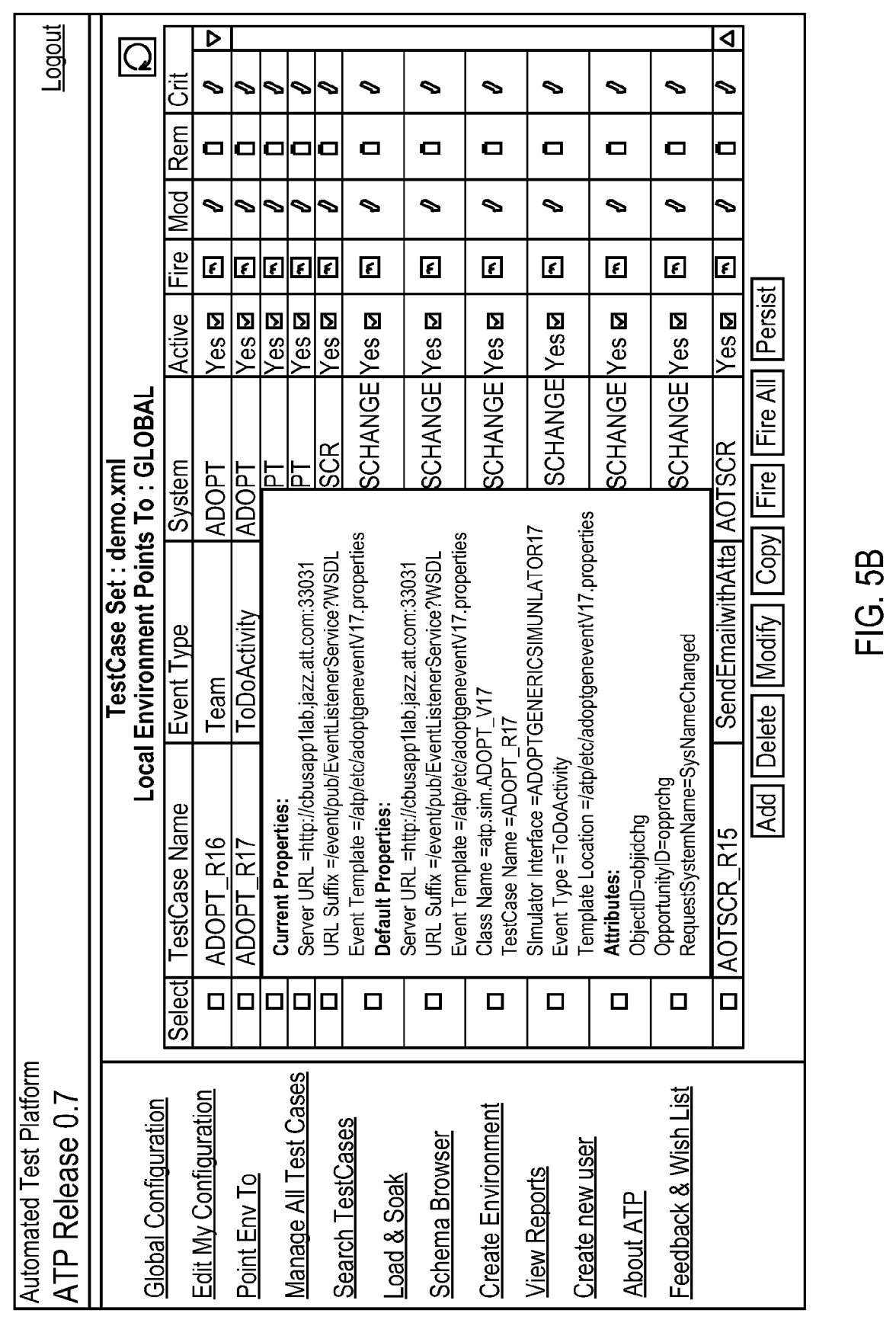

An additional window provided by the screen can also display additional properties and attributes of a test case. This additional window can be activated by hovering the pointer over the particular test case. FIG. 5b shows one example of a screen window detailing the additional properties and attributes of a test case.

Figure 6:
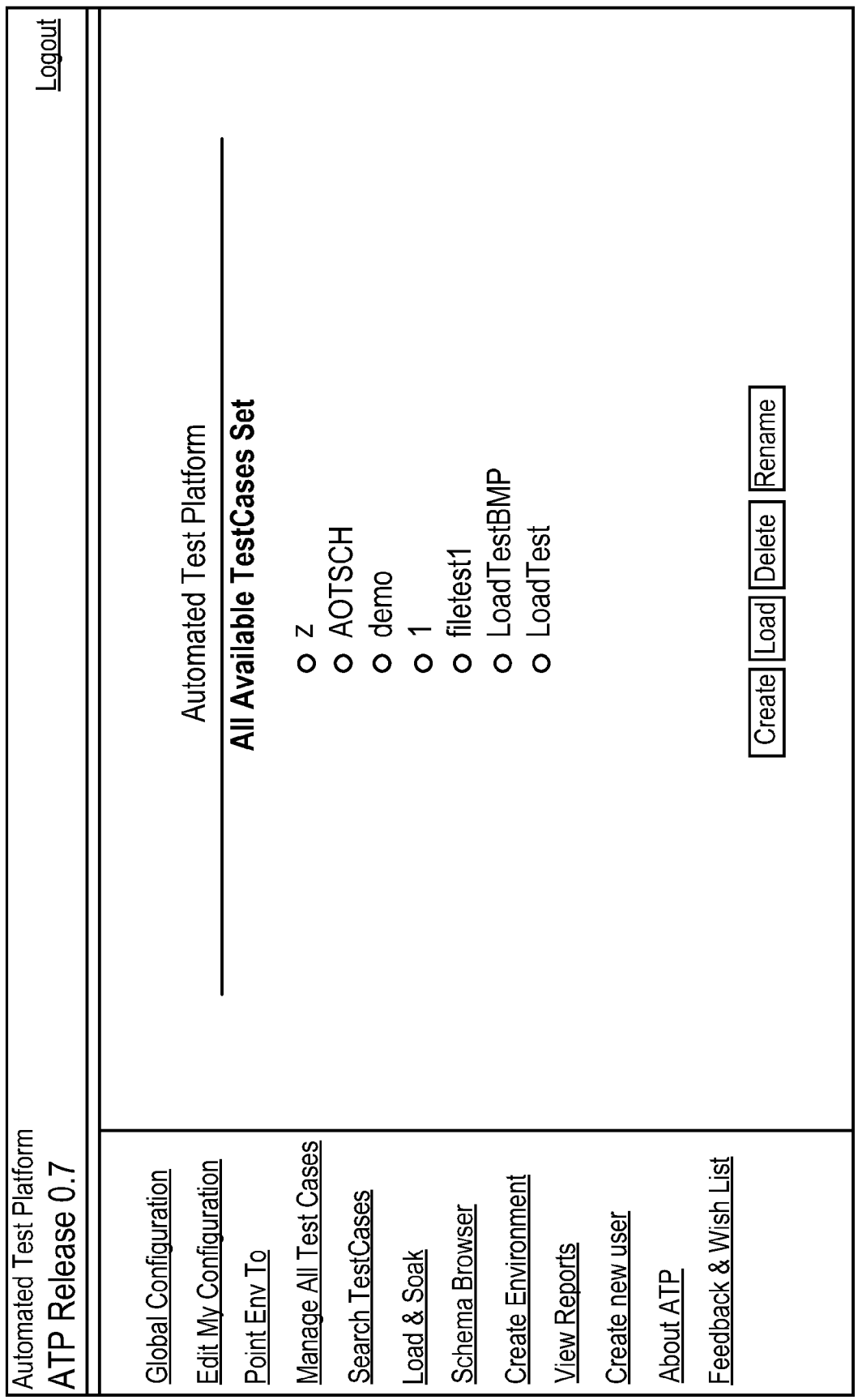
FIG. 6 shows one example of test case selection screen.

Test case sets can also be defined for the logical grouping of test cases. A test case set selection screen can also be provided for defining, selecting, and modifying test case sets. FIG. 6 shows one example of test case selection screen. The screen can provide the option to select one of a plurality of test case sets. Once a test case set is selected, a user can specify to load, delete, or rename the test case set. The user can specify any one of these functions by buttons provided on the screen. The user can also create a new test case set by selecting a create button provided on the screen.

Figure 7:
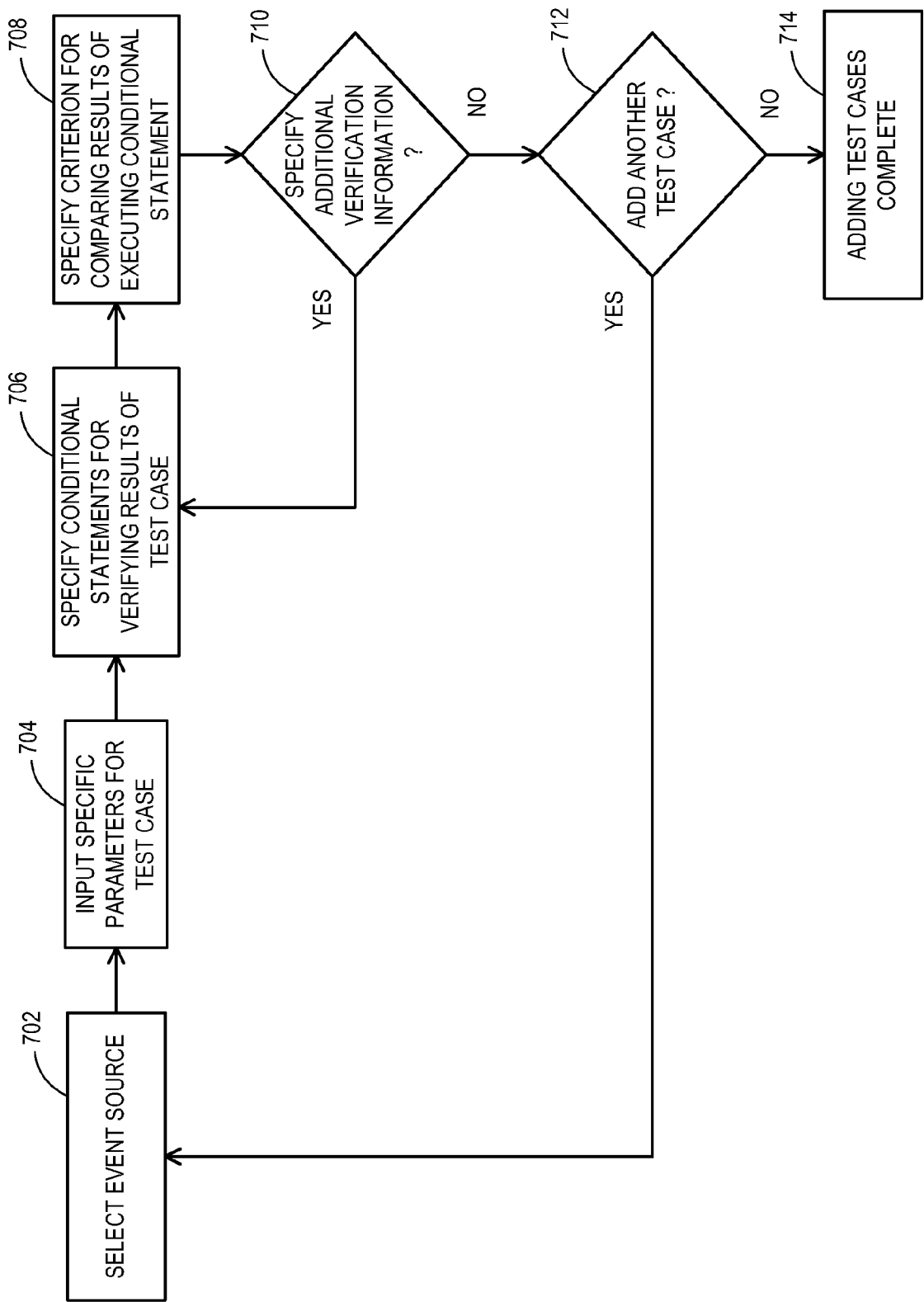
FIG. 7 shows an example of a set of steps for the front-end processing of adding a test case.

FIG. 7 shows an example of a set of steps for the front-end processing of adding a test case. In step 702 the event source (system that the test case is designed for testing) for a new test case can be selected. In step 704, the specific attributes for the test case can be entered. In step 706, conditional statements for verifying the results of the test case can be specified. The conditional statements can comprise Structure Query Language (SQL) statements for execution on a target system after the test case has been fired. In step 708, criterion for the test case can be entered for verifying the results of the test case. The criterion can include the values for the test case to be considered "passed." The conditional statements and the criterion combined can be considered verification information.

In step 710, shown in FIG. 7, a determination can be made as to whether there is additional verification information to be defined for the test case. When there is additional verification information to define, the flow can proceed back to step 706. When there is no additional verification information to define, the flow can proceed to step 712. In step 712, a determination can be made as to whether there are additional test cases to be added. When there are additional test cases to be added, the flow can proceed back to step 702. When there are no additional test cases to be added, the adding of test cases is complete.

Figure 8:
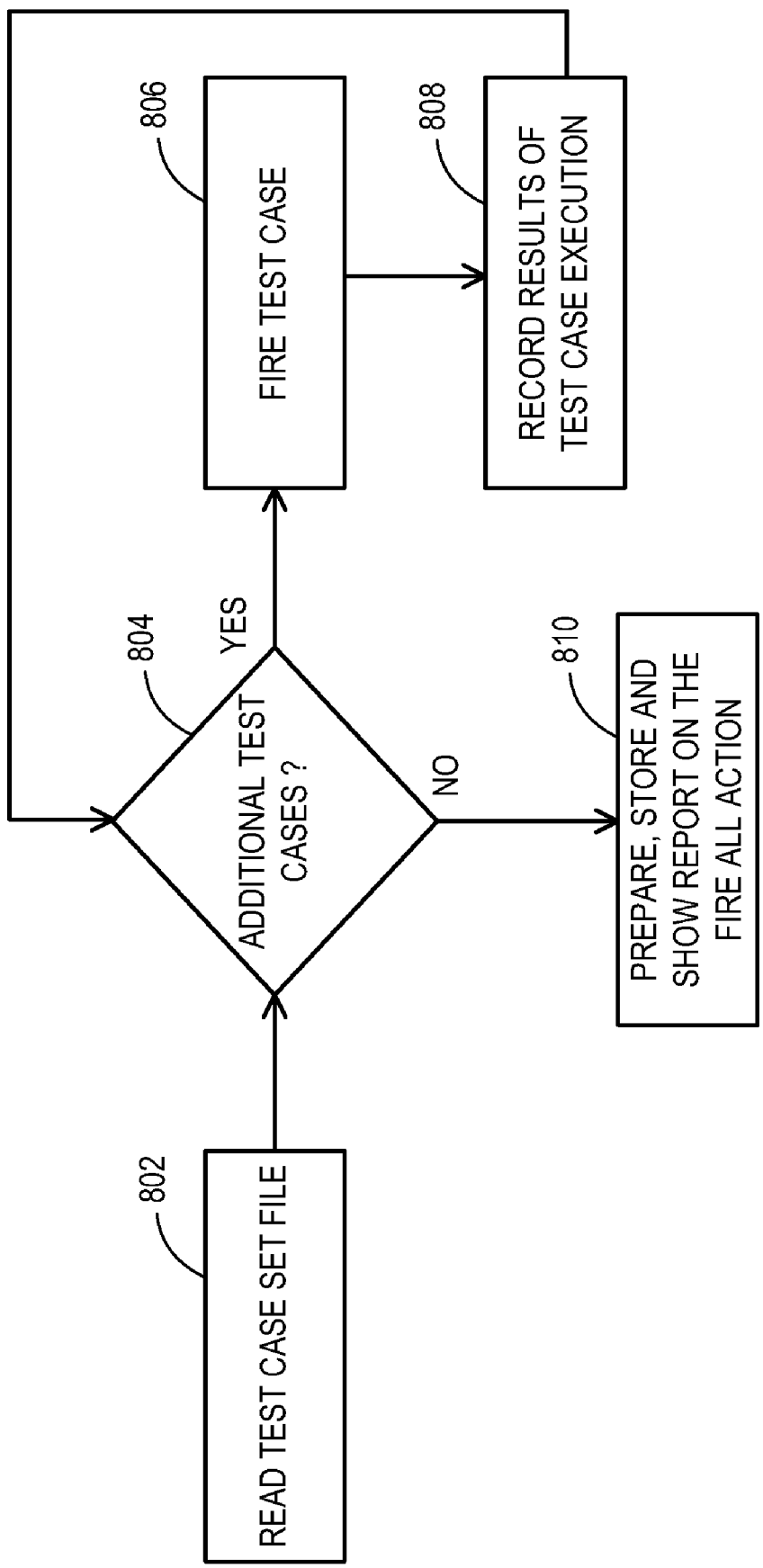
FIG. 8 shows one example of a set of steps that may be performed when all of the test cases of a test case set are fired.

FIG. 8 shows one example of a set of steps that may be performed when all of the test cases of a test case set are fired. All test cases of a test case set can be selected for firing by selecting the "fire all" button provided on the test case selection screen as shown in FIG. 5a. In step 802, a file containing a list of all of the test cases for a test case set can be read. In step 804, a determination can be made as to whether there are test cases remaining to be fired for the test case set. When there is a test case remaining in the test case set, the next test case in the list can be fired in step 806. Further processing of the fired test case progresses as described elsewhere in the disclosure. Once the test case is fired, the results of the test case can be recorded in step 808. The flow then proceeds back to step 804. When there are no additional test cases to be fired for the test case, flow can proceed to step 810. In step 810 the results of the fire all action can be stored and reported.

An Additional module of the platform can be the Environment Replicator 132. The Environment Replicator 132 can be provided to allow the replication of the source environment 130 and the saving of the source environment 130 on the platform. The source environment 130 may also be replicated to a target environment 114 by the Environment Replicator 132. The Environment Replicator 132 enables the moving of the environment of a software application without having to replicate an entire computing system that the software application is running on. The Environment Replicator 132 can accomplish this by copying only the files required by the software application and by performing parameterization of configuration files pertaining to the source environment 130. The parameterization of the configuration files allows a user to move the software application and avoid the risk associated with the manual editing of the configuration files. Copying the necessary information from the source environment 130 for replication can be referred to as taking a snapshot.

The replication of an environment by the Environment Replicator 132 can involve multiple steps. First, the Environment Replicator 132 can request from a user a location of an environment that includes a system (software application) that a user wishes to test or just wishes to move from one computer system to another. The Environment Replicator 132 allows a user to take a snapshot of a computing environment by copying the necessary files and directory structure of the environment. The Environment Replicator 132 may request a user to input where particular files are stored on the source machine related to the source environment 130. A user may need to specify the URL, Internet Protocol (IP) address and paths of where objects related to the source environment 130 are located.

The Environment Replicator 132 also identifies the necessary configuration files required for replicating the source environment 130. The location of the configuration files for the source environment 130 can be identified based on a root location of where software of the source environment 130 is installed that has been specified by a user. The location and names of the configuration files can then be determined based on the root location if the configuration files follow a particular convention for the naming and locations of the files. Once the configuration files are identified these files are also copied from the source environment 130.

Once the configuration files are copied, the Environment Replicator 132 can parameterize the configuration files. Parameterization involves the Environment Replicator 132 identifying key attributes contained within the configuration files that may require new values based on moving the software application from a first location (i.e. source environment 130) to a second location (the platform or target environment 114). Once these key attributes are identified the Environment Replicator 132 can prompt a user for appropriate values corresponding to the replicated location of the software application. The Environment Replicator 132 can prompt a user through a GUI for the necessary changes to the parameterized fields of the configuration files and thus can prevent a user from having to directly edit the configuration files. The configuration files can contain name/value matched pairs for each attribute where the name of an attribute is followed by the configured value for the attribute.

Figure 9:
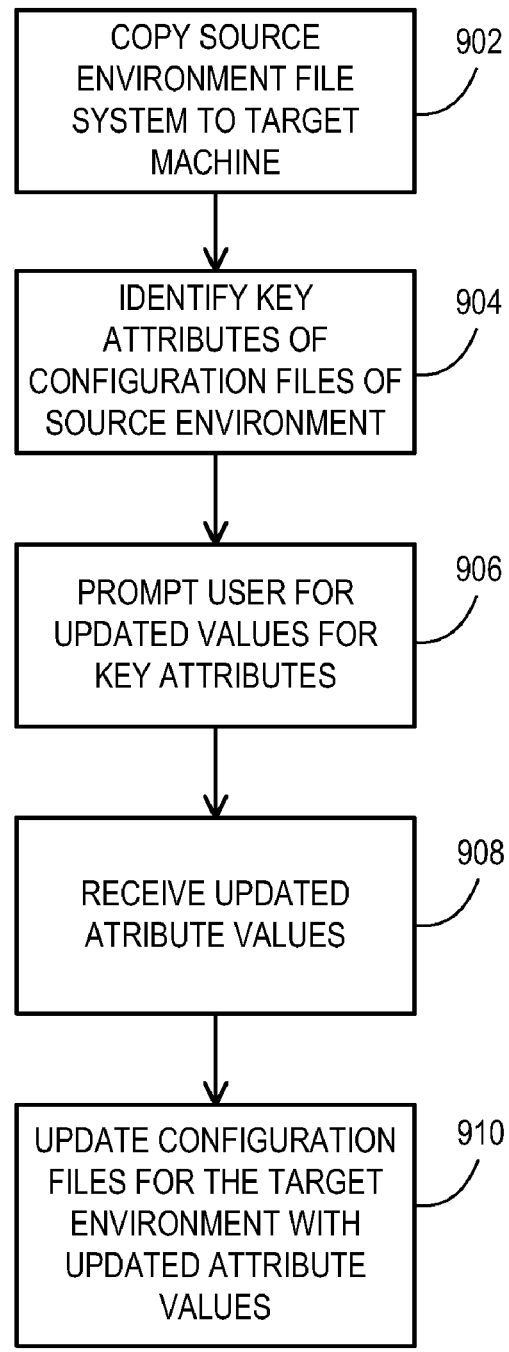
FIG. 9 shows an overview of a set of steps that may be performed for replicating an environment from a source system to a target system.

FIG. 9 shows an overview of a set of steps that may be performed for replicating an environment from the source environment 130 to a target machine to create the target environment 114. In step 902, the file system of the source environment 130 can be copied to the target machine for a target environment. The copied file system can include configuration files that are copied from the source environment 130 to the target machine. In step 904, key attributes of the configuration files of the source environment 130 can be identified. The Environment Replicator 132 can then prompt the user for a user for updated values of the key attributes that apply to the target environment 114 to be created in step 906. In step 908, the Environment Replicator 132 can receive from the user the updated values of the key attributes. The Environment Replicator can then update the configuration files with the updated attribute values received from the user for the target environment 114 in step 910.

In an exemplary embodiment, the configuration files are in an XML format. The identification of key attributes is performed by matching predetermined XML tags that are known to correspond to particular attributes that require updating when an environment is replicated. In another exemplary embodiment, the configuration files are in a standardized form and the Environment Replicator 132 identifies the key attributes according to the standardized form of the configuration files.

Templates can also be provided to aid in the parameterization of configuration files. A template can specify the name of key attributes and the format/structure of the key attributes. The template can also contain information pertaining to the overall structure of the configuration files, the naming conventions of the configuration files, and the appropriate locations of the configuration files relative to a root directory. The template can apply to a class of source environments or a grouping of source environments.

A template may not specify all of the key attributes for a configuration file for a particular source environment. When the template fails to identify all of the key attributes, the platform can receive from a user information to identify additional key attributes that may require parameterization. A template might also not have knowledge of every configuration file for a particular source environment. In that case, the user can also specify the additional configuration files. Once the additional key attributes and/or configuration files are supplied, this additional information can be combined with an existing template to define a new template that can apply to another grouping of source environments.

A template may include suggested values for a user to update key attributes with or the template may specify to the Environment Replicator 132 to automatically insert new values for certain key attributes. One particular example can be where there are numerous key attributes that contain the same value, such as the new address of the replicated source environment 130 (i.e. the target environment 114). This new address can be inserted into the appropriate value fields as required.

Particular examples of key attributes can include: network addresses of the destination system, system names, socket addresses that the software application may use for communication, the maximum number of sockets to be used by the application, the number of file descriptors available and file system paths. Once the new values of the attributes are provided, the Environment Replicator 132 can update the replicated configuration files accordingly.

In a particular embodiment, a screen can be provided by the Environment Replicator 132 for specifying the details to create a snapshot of a database. As one particular example, the screen can be adapted for taking a snapshot of an Oracle database. The screen can also be adapted for taking a snapshot of other database products or can be adapted for taking a snapshot of various types of databases. FIG. 10*a* shows an example of a screen for taking the snapshot. The screen can have a plurality of labels as shown in the figure for specifying various attributes pertaining to taking the snapshot. These labels can have corresponding fields for specifying values for the various attributes. Depending upon the particular attribute, these fields can accept free-form text or can provide a drop down box for selecting various predetermined values from the drop down box. A button can also be provided for executing/running the snapshot.

An additional screen can be provided for specifying the source environment 130 and the target environment 114 in replicating an environment by the Environment Replicator 132. FIG. 10*b* shows an example of a screen for replicating an environment. In an exemplary embodiment, the screen can provide fields for specifying addresses pertaining to both the source environment 130 and the target environment 114 including the Machine IP, port and the machine location for each environment. A button can also be provided for the running of the replication.

An additional module can be included with the platform. The Load and Soak Browser 104, as shown in FIG. 1, can be provided to allow the testing of a plurality of test cases along with the repetitive testing of a plurality of test cases. Test cases can be fired in Bulk Load or Maintained Load mode for the automating of stress testing and regression testing.

The Bulk Load mode can comprise loading the target environment 114 with the normal activity of a typical system and increasing the frequency of simulated events to identify the "breaking point"—the performance limitation of the software application running on the target environment 114. For example, a user can specify that all test cases for a particular system be ran at periodic intervals at a certain frequency that approximates the expected use of the application by the user community. The frequency of the test cases can be increased until the target environment 114 being tested responds at an unacceptable level. An unacceptable level can be defined as when a certain level of errors are recorded in the event related data of the target environment 114. For example, a user can specify that all test cases of a set 1 of test cases and a set 2 of test cases for a particular system be executed within a particular period of time. The time period between firing of test cases can then be incrementally changed to shorter periods until performance of the system degrades to an unacceptable level.

The Maintained Load option can allow a source system to be tested for a prolonged period of time according to the expected regular productive use of the source system. An extended duration can be specified to running a pattern of selected events. The pattern of events can be selected to approximate the expected use that the system would receive. The events can then be ran in this pattern repetitively for the specified extended duration.

Another additional module of the platform can be the Configuration Engine 122. The Configuration Engine 122 can allow a user to specify a new system for testing or edit the configuration of a previously defined system. The Configuration Engine 122 reads the configuration files previously stored with the platform to initialize the platform upon start up. For each system defined within the platform, there can be a set of configuration files. The configuration settings for a system defined on the platform include means for specifying the target environment where simulated events are to be transmitted to for testing. For each system defined on the platform, the platform can include the machine address of the target environment for running simulated events configured for a particular target system. The address of a target environment can be provided as an IP address. In an embodiment adapted for web services, the configuration settings can include the URL for the target environment where simulated events are to be transmitted for testing for a particular system.

In an embodiment, a configuration file can have three levels: global, local, and temporary. The global level contains configurations shared by all users of the platform. The local level contains configurations for only the current user. The temporary level contains configurations for the current session of the user. The local configuration settings can override the global configuration settings. The temporary configuration settings can override both the global and local configuration settings.

When defining a new system within the platform, the user can select whether the change to the configuration is to affect the global, local, or temporary configuration. After specifying which configuration the new system is to be applied to, the new system can be defined.

Figure 11A:
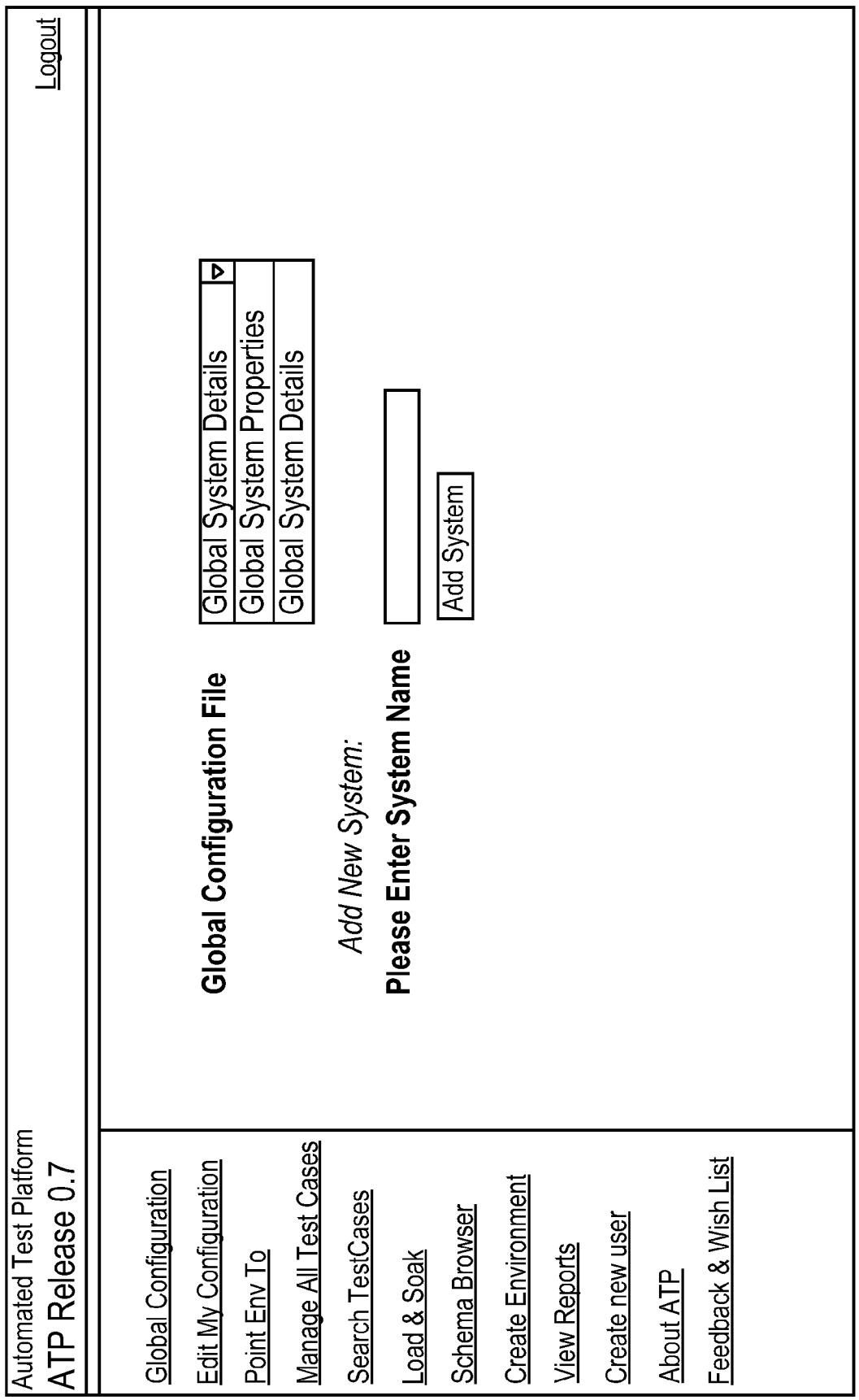
FIG. 11a shows an example of a screen for configuring the global configuration.

In FIG. 11*a*, an initial screen is shown for an exemplary embodiment of the platform for configuring the global configuration. In the screen, a drop down box can be provided for selecting the global system properties or global system details for editing or viewing. A button can also be provided for selecting the selected file for viewing or editing. A field can also be provided for specifying a new system to be added to the platform. A button can also be provided for adding a new system once the field is populated with a name for the system.

FIG. 11*b* shows another screen for interacting with the global configuration file. A plurality of event attribute labels and corresponding values can be provided on the screen. A tab can be provided for each system defined in the global configuration. A plurality of event type labels and corresponding fields for event type values can also be provided. Each tab can provide a plurality of event types and event attributes for the given system for that tab. Buttons can be provided for adding new event attributes and event types for a given system. The add event attribute and event type buttons can be shown when an administrator is logged into the platform. When a non-administrator is logged into the platform these buttons can be hidden and not available to the user. Similar screens can also be provided also for the temporary and local configuration files. By the use of such a screen, a user of the platform can update the attributes for a given system defined within the platform. Default values of attributes can be changed, attributes removed, and attributes can be added for a system.

For local configuration settings, an additional screen can be provided, as shown in FIG. 11*c*. In an exemplary embodiment where the platform is adapted for providing testing for software applications that support web services, the screen can provide a field for specifying a single URL for pointing test cases towards. This URL will direct the platform to deliver all simulated events from test cases to the specified location (i.e. designate a particular target system for all events to be transmitted to). From this screen, a drop down box can also be provided to allow a user to select local system properties or local system details to be viewed or edited.

Another module of the platform can be the Introspection and Schema Inspector 106 as shown in FIG. 1. The module may also be referred to as the Inspector 106. The Inspector 106 is capable of inspecting the data structure of the target environment 114 that contains historical data regarding the response of the target system to received events. Once the data structure is discovered the Inspector 106 can determine the structure required for conditional statements to verify simulated events once they have been received by the target environment 114. This structure can then enable the creation of the conditional statements for verifying the results of the simulated events received by the target environment 114. Rather than inspecting the data structure of the target environment 114, the Inspector 106 may also be configured to inspect the data structure of the source environment 130 that corresponds to the system to be tested. The source environment 130 may be accessed remotely at the source machine or accessed via the snapshot of the source environment 130 stored on the platform within the Data Store 124.

As a simplified example of the functionality of the Inspector 106, a test case may be written to test an email system, the test case defined to simulate an e-mail being delivered to the target environment 114. A user may desire that verification information be defined for the test case that verifies that the email was received properly by the target environment 114. However, the user may not know how the receipt of an e-mail is recorded or logged by the target environment 114. The Inspector 106 can expose the data structure of the target environment 114 that records or logs the receipt of emails. Once the data structure of the target environment 114 is exposed, conditional statements for querying the receipt of an email can be determined based on the data structure of the target environment 114.

The Inspector 106 can provide to a user suggested conditional statements for a user to select for verifying the results of a test case. Depending upon the data structure of the target environment 114, the Inspector 106 can provide complete conditional statements for the user to select or may provide to the user partial conditional statements to the user where the user may need to complete the conditional statements. The selection by the Inspector 106 of suggested conditional statements may be at least partially based on attributes specified for the particular test case.

In an exemplary embodiment, the platform and target environment 114 can support Java Database Connectivity (JDBC) for the exchange of data. The platform can also support Open Database Connectivity (ODBC). The data structure of the target environment 114 can comprise a relational database. The target environment 114 can be a replicated environment stored on the automated testing platform, or a production environment at a remote location that is accessible to the platform. The target environment 114 can also be a dedicated testing environment.

A further module of the platform can be the Criteria Engine 108. The Criteria Engine 108 is capable of retrieving historical event related data of the target environment 114. By retrieving historical event-related data, the Criteria Engine 108 can define criterion for a test case. The conditional statements defined using the Inspector 106 combined with the criterion defined with the Criteria Engine 108 can be combined as verification information for a test case. The event related data can include values stored in log files or a data store of the target environment 114 related to the processing of received events. Along with the event related data, the Criteria Engine 108 can retrieve the attributes for the events that correspond to the values related to those particular events. From these values, corresponding event attributes and related conditional statements, the Criteria Engine 108 can provide to a user expected values that should result from test cases that specify related attributes when the test cases are fired against the target environment 114.

Figure 12:
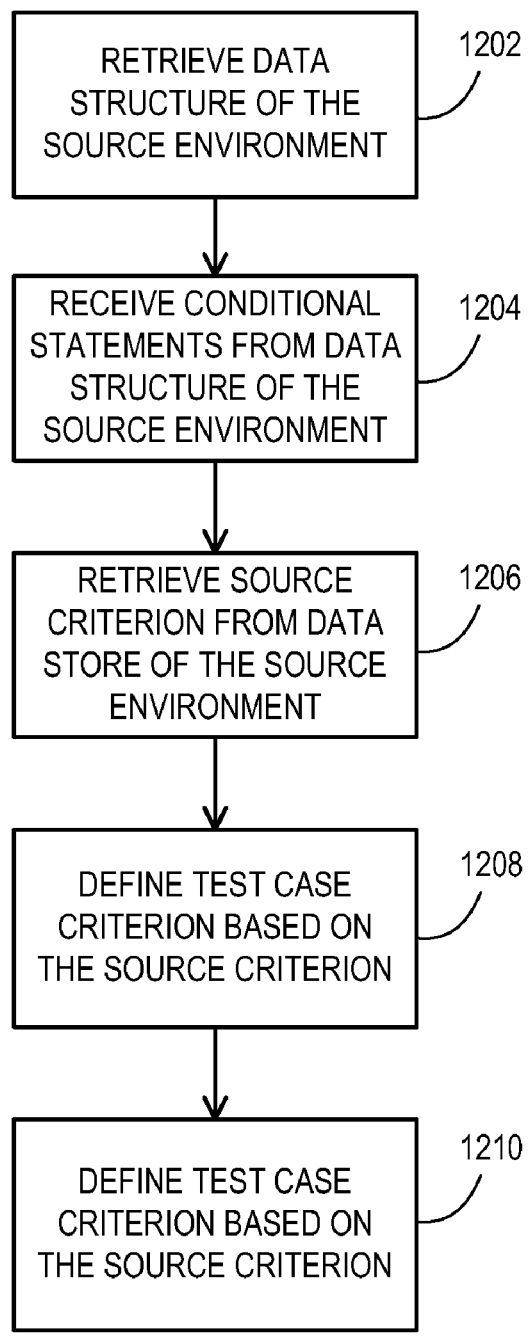
FIG. 12 shows one example of an overview of a set of steps that may be performed for specifying conditional statements and criterion for defining verification information of a test case

FIG. 12 shows an overview of a set of steps that may be performed by the Inspector 106 and the Criteria Engine 108 for specifying conditional statements and criterion for defining verification information of a test case. In step 1202, the data structure of the source environment 130 can be retrieved. In step 1204, one more conditional statements can be created based on the data structure of the source environment. In step 1206, source criterion from a data store of the source environment 130 can be retrieved. Once the source criterion are retrieved, criterion for the test case can be defined based on the source criterion in step 1208. In step 1210, the conditional statements and criterion can be combined and saved as verification information for the test case.

As a simplified example of the functionality of the Criteria Engine, a test case may be written to test an email system, as in the example given above in regards to the Inspector 106, with a test case defined for simulating an event being delivered to a target environment 114. Conditional statements may be defined for verifying the receipt of the email but the expected results of applying the conditional statements to the target environment may not be know by the user of the platform. The Criteria Engine can be used to retrieve values from previous events, such as values saved in a log file or a data store, due to a previously received e-mail or a previously ran test case that prompted the simulation of an e-mail being sent, and provide these values to the user to allow the user to specify or select the expected results of the conditional statements. These expected results can be saved as the criterion for the test case.

Rather than inspecting the event related data of the target environment 114, the Inspector 106 may also be configured to inspect the event related data of the source environment 130 that corresponds to the system to be tested. The source environment 130 may be accessed remotely at the source machine or accessed via the snapshot of the source environment 130 stored on the platform.

The expected results of a test case discovered by the Criteria Engine 108 can be used to specify criteria for the test case. The criteria for a test case are associated with related conditional statements for the test case. When the conditional statements are ran on the target environment 114, the expected results are specified by the selected criterion. The conditional statements and the combined matching criterion can be referred to as verification information. The verification information can include rules for when the results for a test case are to be considered as "passed" or "failed." The verification information can be saved as part of the properties of a test case. The rules can define that certain responses should be within a specified range of the expected results (criteria) or that a specified amount of expected results must be met for a test case to be marked as passed.

Another module of the platform can be the Simulator Engine 110. The Simulator Engine 110 can simulate events based upon received test cases. The simulator engine operates by the use of Adaptors 112. An Adaptor specifies the structure required for the event based upon the structure of the source environment 130. The Adaptor also provides all necessary default attributes for a simulated event. In a particular embodiment, an event can have 200 or more attributes. The attributes defined by the test case replace or overwrite the attributes defined within the Adaptor. For attributes not specified by the test case, the default values provided by Adaptors 112 are used in creating the simulated event. In a preferred embodiment, each Adaptor is a compiled executable. In an alternative embodiment, each Adaptor may be a flat file with the attributes and structure of events for the system specified in plain text.

For the source system, an Adaptor can be defined on the platform prior to the running of a test case for the source system. If an Adaptor is not defined on the platform when a test case is ran, an Adaptor can be created dynamically by examining the configuration files for the source environment 130. The configuration files of the source environment 130 can be accessed from a copy of the configuration files saved on the platform where the copy was created by the platform previously taking a snapshot of the source environment 130. The configuration files of the source environment 130 may also be accessed by the platform receiving an address of the source environment 130 and the platform remotely accessing the source environment 130 located on a source machine. The address of the source environment 130 may be specified in a particular embodiment by a user entering one or more URLs that specify the location(s) of the source environment 130 configuration files.

The configuration files of the source environment 130 are examined to identify the structure and attributes for building an Adaptor for the source system. For the platform to dynamically build the Adaptor the configuration files must be understood by the platform and contain all necessary information for building the Adaptor. The dynamic building of an Adaptor can occur automatically with no input from a user. When the source system is not defined on the platform, not accessible to the platform, or when the configuration files of the source environment 130 are not understood by the platform, an Adaptor may be built by receiving input from a user. The platform may also be able to partially build an Adaptor automatically by examining the source environment 130 configuration files and then complete the building of the Adaptor by receiving input from a user. Once an Adaptor is built for a source system the Adaptor is saved in the Data Store 124 of the platform. The platform can also be adapted to recognize the structure of additional source environment 130 configuration files by modifying or adding to the open API of the platform.

For the Simulator Engine 110 to simulate an event, the Simulator Engine 110 parses a test case to identify which source system the case is written for. Based on the identification of the source system for the test case, the Simulator Engine 110 determines which Adaptor to use for simulating an event for the test case. The Simulator Engine 110 executes the particular Adaptor and creates the simulated event based on the output of the Adaptor and attributes specified for the test case. The Simulator Engine 110 then transmits the simulated event to the target environment 114. In a typical embodiment, the platform determines the address of the target environment 114 based on the system specified for the event. The address of the target environment 114 for the system can be retrieved from the configuration files for the system stored on the platform in the Data Store 124.

Figure 13:
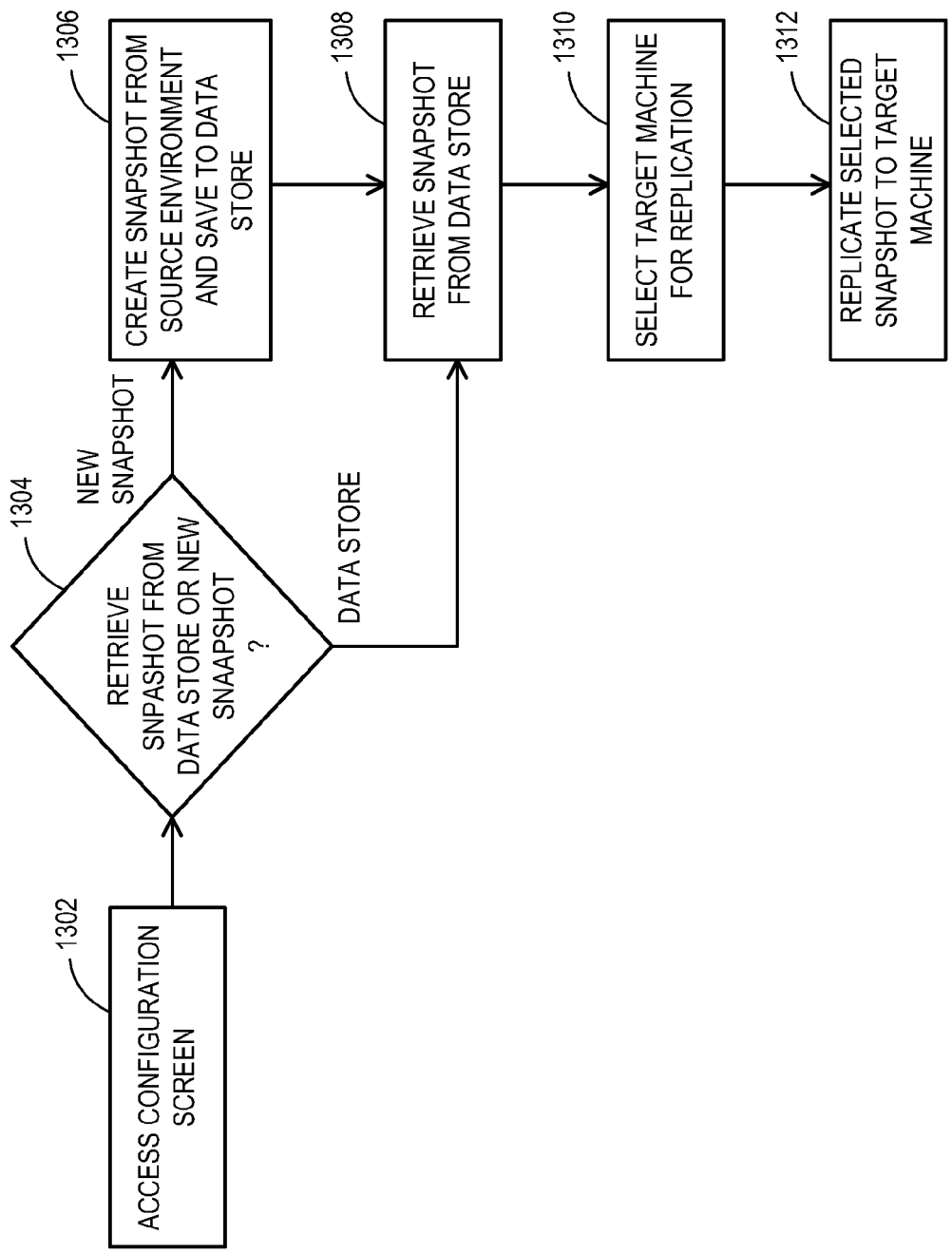
FIG. 13 shows one example of a set of steps that may be performed for creating a target environment.

Prior to the Simulator Engine 110 transmitting an event to the target environment 114, the target environment 114 may be configured for the processing of events received from the Simulator Engine 110. FIG. 13 shows one example of a set of steps that may be performed for creating the target environment 114. In step 1302 an environment configuration screen can be accessed. In step 1304, whether a snapshot for creating the target environment 114 is to be used from the data store or a new snapshot is to be used can be determined. When a new snapshot is to be used, in step 1306 the snapshot from the source environment 130 can be created and stored in the Data Store 124. Once the new snapshot is created, flow can proceed to step 1308 and the snapshot can be selected from the Data Store 124. In step 1310, the machine for the target environment 114 can be selected. In step 1312, the selected snapshot can be replicated to the selected target machine.

An additional module of the platform can be the Result Verifier 116. The Result Verifier 116 determines the results of test cases. The Result Verifier 116 determines results of the test case by interrogating the event logs or event data of the target environment 114. The interrogation can be performed in an exemplary embodiment by querying the target environment 114. The target environment 114 can be queried via JDBC or ODBC calls to the target environment 114. The Result Verifier 116 determines the results by the verification information provided for a test case.

The Result Verifier 116 can query the target environment 114 with the conditional statements associated with a test case. The response of the target environment 114 can be compared to the criterion specified for the test case. If the response matches the specified criterion then the test case can be marked as a success. Rules may also specify that a relationship between the response to the conditional statements and the criterion for a test case to be marked as "passed" or "failed." When rules are specified for the test case, the determination can further involve the Result Verifier 116 verifying whether the test case "passed" or failed." Test cases do not need to specify criterion to be ran or fired successfully. Test cases can be ran and the response of the target environment 114 can be recorded when no verification information is specified.

Figure 14:
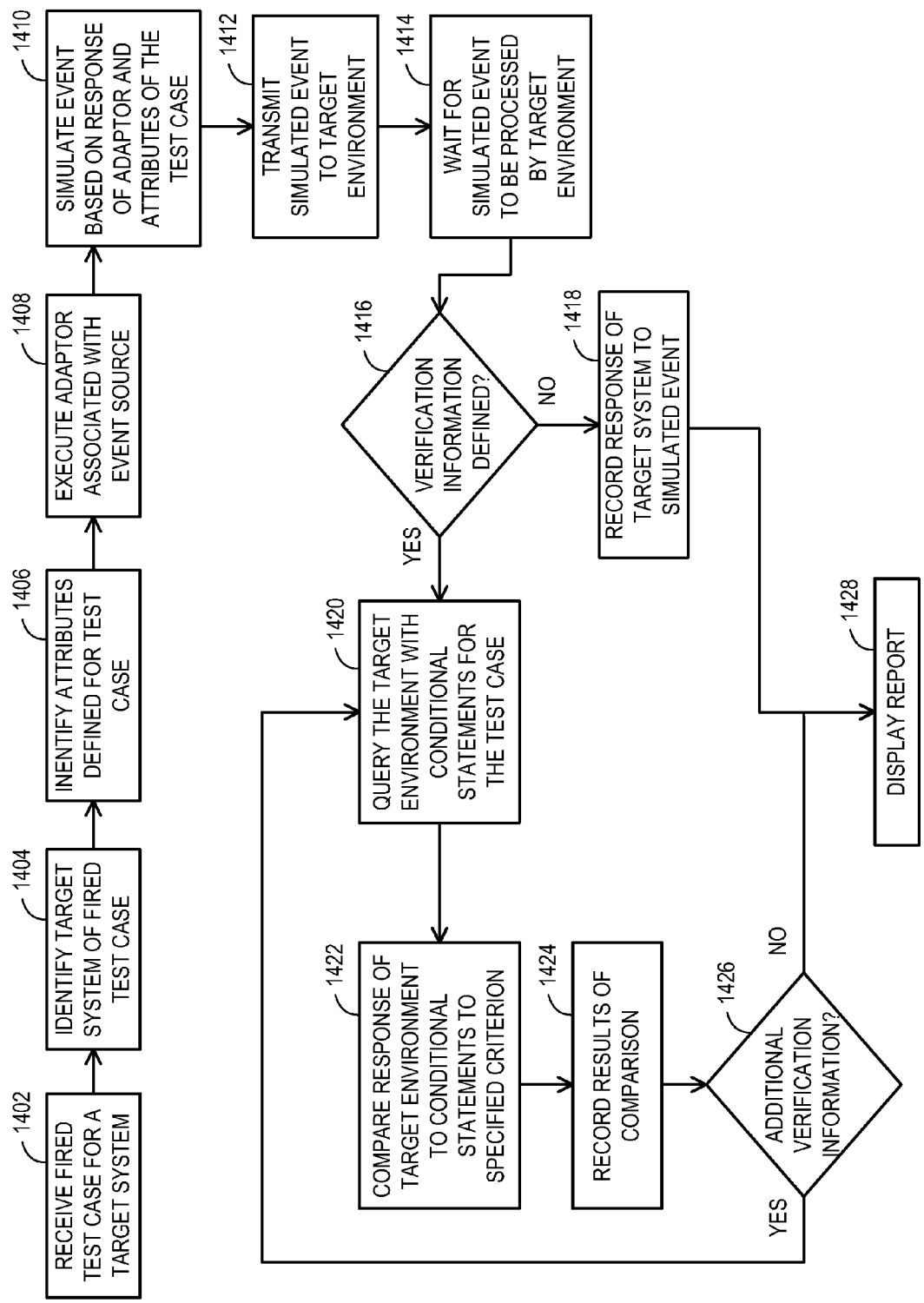
FIG. 14 shows one example of a set of steps that may be performed for the backend processing of a fired test case.

FIG. 14 shows one example of a set of steps that may be performed for the backend processing of a fired test case. In step 1402, a fired test case for a target system is received. In step 1404, the target system of the fired test case is identified. In step 1406, the attributes of the test case are identified. In step 1408, the Adaptor associated with the event source is executed. In step 1410, an event is simulated based on the response of the Adaptor and the attributes of the test case. In step 1412, the event is transmitted to the target environment 114 as configured in the platform. In step 1414, the platform waits for the event to be processed by the target environment 114.

In step 1416 shown in FIG. 14, a determination is made as to whether verification information has been supplied for the test case. When verification information is provided, flow can proceed to step 1420. When no verification information is provided for the test case, flow can proceed to step 1418. In step 1420, the target environment 114 can be queried with the conditional statements. In step 1422, the response of the target environment 114 to the conditional statements can be compared to criterion defined for the test case. In step 1424, the results of the test case can be recorded to the Data Store 124. In step 1426, a determination can be made as to whether there is additional verification information to be checked for the test case. When there is additional verification information for the test case, flow can proceed back to step 1416. When there is no additional checking to be performed, flow can proceed to step 1428. In step 1428, the results of the test case can be displayed via a report.

Another additional module of the platform can be the Result Logger 118. The Result Logger 118 can receive the results from the Result Verifier and log them to the Data Store 124 via the Data Bus 126.

A further module of the platform can be the Reporting Engine 134. The Reporting Engine 134 can retrieve the results from the Data Store 124 and present the results through various graphical means for a user to view or print. In an exemplary embodiment, the Reporting Engine 134 interfaces with a third party reporting tool to present reports to users.

While embodiments have been particularly shown and described, it will be understood by those skilled in the art that various other changes in the form and details may be made therein without departing from the spirit and scope of the invention.

What is claimed is:

1. A method for the automated testing of an event driven software application comprising:
   retrieving an event structure and default event attributes for one or more systems from configuration files of each of the one or more systems;
   creating via a processor one or more adaptors for each of the one or more systems from the event structure and the default event attributes of each of the one or more systems, each adaptor defined for a particular system;
   receiving information that specifies a target system, non-default event attributes, and verification information to create a test case,
   wherein, upon receiving a request to fire the test case:
      an adaptor for the target system is executed, the adaptor providing the event structure and default event attributes for events of the target system,
      a simulated event is generated based on the event structure, default event attributes and non-default attributes,
      the simulated event is transmitted to the target system,
      and the results are determined by examining a response of the target system to the simulated event and comparing the response to the verification information of the test case.

2. The method of claim 1, wherein the response of the target system to the simulated event is examined by transmitting a query to the target system with one or more conditional statements and receiving a response to the query from the target system, and wherein comparing the response to the verification information of the test case further comprises comparing the response to the query to one or more criterion specified for the test case.

3. The method of claim 2, further comprising building the one or more conditional statements by requesting and receiving an event related data structure from the target system.

4. The method of claim 3, further comprising specifying the one or more criterion based on event related data received from the target system.

5. The method of claim 1, wherein the configuration files of the one or more systems are retrieved from one or more source systems.

6. The method of claim 5, wherein the configuration files are stored in a data store of a testing platform.

7. The method of claim 1, further comprising replicating a source system to create the target system prior to firing the test case.

8. The method of claim 7, wherein the replicating of the source system further comprises parameterizing one or more configuration files of the source system by identifying key attributes of the one or more configuration files for modification.

9. A computer readable medium containing instructions that when executed by a processor result in acts comprising:
   retrieving an event structure and default event attributes for one or more systems from configuration files of each of the one or more systems;
   creating one or more adaptors for each of the one or more systems from the event structure and the default event attributes of each of the one or more systems, each adaptor defined for a particular system;
   receiving information that specifies a target system, non-default event attributes, and verification information to create a test case,
   wherein, upon receiving a request to fire the test case:
      an adaptor for the target system is executed, the adaptor providing the event and default event attributes for events of the target system,
      a simulated event is generated based on the event structure, default event attributes and non-default attributes,
      the simulated event is transmitted to the target system,
      and the results are determined by examining a response of the target system to the simulated event and comparing the response to the verification information of the test case.

10. The computer readable medium of claim 9, wherein the response of the target system to the simulated event is examined by transmitting a query to the target system with one or more conditional statements and receiving a response to the query from the target system, and wherein comparing the response to the verification information of the test case further comprises comparing the response to the query to one or more criterion specified for the test case.

11. The computer readable medium of claim 10, further comprising building the one or more conditional statements by requesting and receiving an event related data structure from a source system.

12. The computer readable medium of claim 11, further comprising specifying the one or more criterion based on event related data received from the source system.

13. The computer readable medium of claim 9, wherein the configuration files of each of the one or more systems are retrieved from one or more source systems.

14. The computer readable medium of claim 13, wherein the configuration files are stored in a data store of a testing platform.

15. The computer readable medium of claim 9, further comprising replicating a source system to create the target system prior to receiving the request to fire the test case.

16. The computer readable medium of claim 15, wherein the replicating of the source system further comprises parameterizing one or more configuration files of the source system by identifying key attributes of the one or more configuration files for modification.

17. A method for the automated testing of an event driven software application comprising:
   receiving a request to fire a test case, wherein the test case specifies a target system, non-default event attributes, and verification information;
   in response to the request to the fire the test case, a processor executing an adaptor, wherein an adaptor is defined for a plurality of target systems, each adaptor specifying an event structure and default event attributes based on information contained in configuration files of each target system;
   receiving from the executed adaptor the event structure and default attributes of the target system;
   generating a simulated event based on the event structure, the default event attributes and the non-default event attributes;
   transmitting the simulated event to the target system; and
   determining the results of the test case by examining a response of the target system to the simulated event and comparing the response to the verification information of the test case.

18. The method of claim 17, wherein the verification information further comprises one or more conditional statements and one or more corresponding criterion.

19. The method of claim 17, wherein the configuration files are retrieved from one or more source systems and stored in a data store.

20. The method of claim 19, further comprising creating a target environment prior to transmitting the event to the target system, wherein the target environment includes the target system.

* * * * *